May 1, 1923.
E. M. BURNHAM
1,453,436
HOLDER FOR WHEEL LOCKS
Filed April 3, 1922
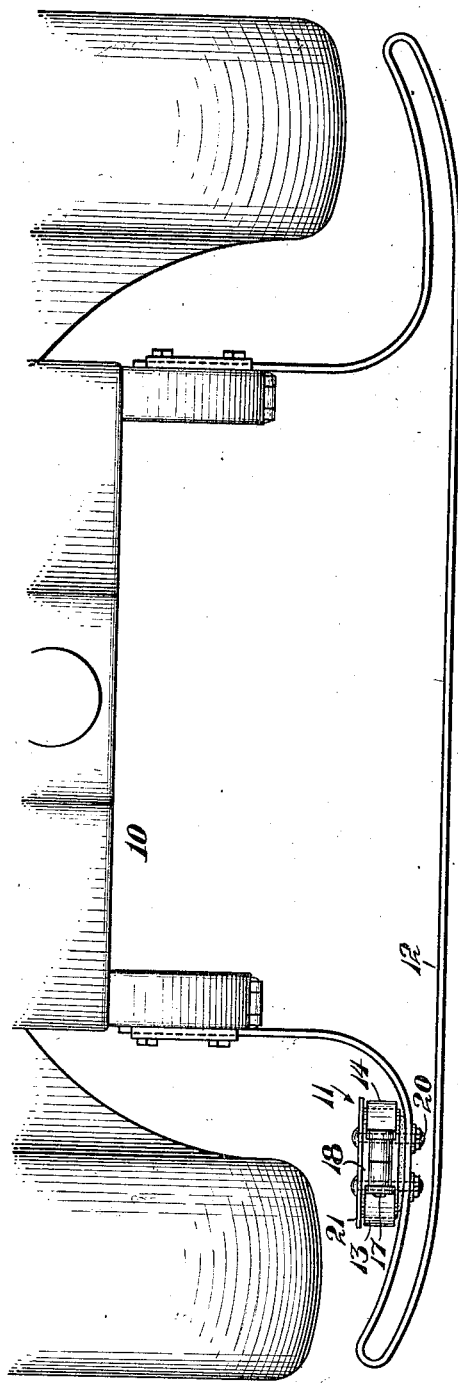
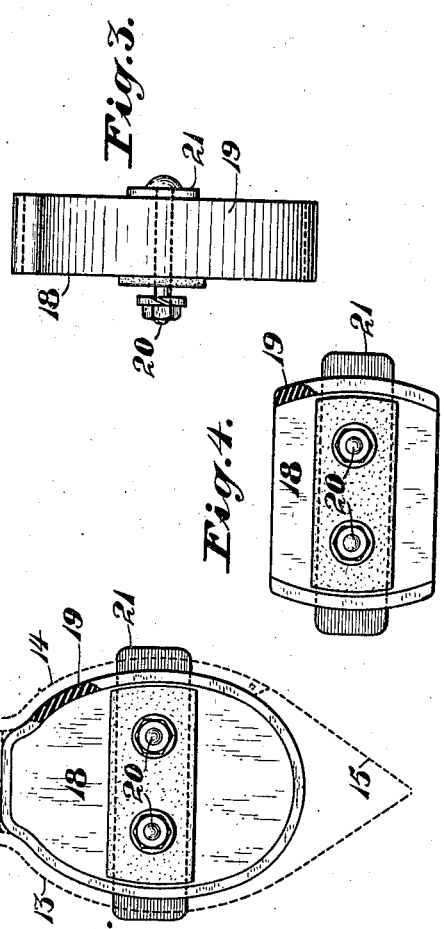
Inventor
Edward M. Burnham
By Dewey, Strong,
Townsend and Loftus
Attorneys Patented May 1, 1923.

1,453,436

UNITED STATES PATENT OFFICE.

EDWARD M. BURNHAM, OF SAN FRANCISCO, CALIFORNIA.

HOLDER FOR WHEEL LOCKS.

Application filed April 3, 1922. Serial No. 549,230.

*To all whom it may concern:*

Be it known that I, EDWARD M. BURNHAM, a citizen of the United States, residing at the city and county of San Francisco and State of California, have invented new and useful Improvements in Holders for Wheel Locks, of which the following is a specification.

This invention relates to holders for locks such as are used on vehicle wheels.

Of late years there has come into general use a type of wheel lock to fit around the tire and felly of an automobile wheel for the purpose of preventing unauthorized use of the vehicle by interposing an obstruction to the operation thereof and by imparting a bumping action to the vehicle in case the same is operated. When not in use these locks are frequently applied to the spare tire, and, inasmuch as they do not fit snugly, they move up and down freely on the tire when the vehicle is operated and cause considerable wearing of the tire. A tire can, in a short time, be rendered almost worthless in this manner. The other alternative is to leave the lock unattached in the body of the vehicle, and, if the car is left unattended for any space of time in a garage or elsewhere, the lock is liable to be stolen by petty thieves who make a practice of plundering automobile accessories.

The object of the present invention is to provide a special holder for a lock of this character such that the lock, when not in use, can be placed thereon and securely and snugly held. The holder is permanently fastened to a convenient portion of the vehicle and is shaped to hold the lock against vibration or rattling. The lock, when placed thereon and closed, cannot be removed without unlocking the same.

In the accompanying drawing, Fig. 1 shows a plan view of a front portion of a vehicle fitted with a holder embodying one form of my invention.

Fig. 2 shows a side elevation of the holder with a lock in position thereon.

Fig. 3 shows an edge view of the holder.

Fig. 4 shows a side view of a modified form of holder.

The front end of a vehicle is indicated at 10 and a holder embodying my invention is indicated generally at 11, being in this instance attached to a bumper bar 12 on the vehicle. Of course, the holder may be fastened elsewhere on the vehicle, but the bumper makes an ideal location, since it leaves the lock in a convenient position for use. The type of lock herein shown comprises generally a pair of hinged jaws 13 and 14 with a chock portion 15 at the hinged end and inward projections 16 at the opposite ends of the jaws, which projections are fitted with key-actuated locking mechanism 17.

The holder comprises a block 18 of a size to fit snugly within the closed jaws of the lock. The block need not follow the contour of the lock, it being sufficient to have it engage with opposite sides thereof over a sufficient area to prevent movement of the lock thereon, as shown in Fig. 4, for example. This block is preferably covered with some sort of a packing 19 of a compressible nature to insure snugness of fit between the block and the jaws of the lock. Rubber, felt or even springs may be used for this purpose. The block is fastened to its support by bolts 20 or otherwise, and at its exposed side it has a plate 21 or other member projecting beyond the periphery of the block so as to form a sort of a rim or flange to prevent the lock from being slipped off in an axial direction when the jaws are closed.

It will be seen that when the lock is placed around the block and the jaws closed and locked together, the lock cannot be removed without unlocking the jaws. Likewise, on account of the packing material and the closeness of the fit between the holder and lock, the latter will be held tightly upon the holder and therefore will not vibrate or rattle when the vehicle is being operated. The lock is thus kept in a convenient position at all times and its exposed position will serve as a reminder to the operator to use it when leaving his vehicle. The device can be made very cheaply and can be applied in a few moments to any vehicle.

Various changes in the construction and arrangement of the several parts herein shown and described may be employed without departing from the spirit of my invention as disclosed in the appended claims.

Having thus described my invention, what I claim and desire to secure by Letters Patent is:

1. A holder for a wheel lock of the type mentioned comprising a block adapted to be permanently fastened to a vehicle, said block being of a size and shape to fit within the lock and engage snugly with opposite portions of the lock when the latter is in closed position thereon, and a projecting rim portion on the front face of the block to prevent removal of the lock in an axial direction.

2. A holder for a wheel lock of the type mentioned comprising a block adapted to be permanently fastened to a vehicle, said block being of a size and shape to fit within the lock and having a packing of a compressible nature to engage snugly with opposite portions of the lock when the latter is in closed position thereon and a projecting rim portion on the front face of the block to prevent removal of the lock in an axial direction.

3. The combination with a vehicle of a holder for a wheel lock of the type mentioned comprising a block supported upon the vehicle, means for permanently fastening the block in place on the vehicle, said block being of a size and shape to fit within the lock and having portions to engage snugly with opposite sides of the lock when the latter is in closed position thereon, and means on the front face of the block projecting radially therefrom to prevent removal of the lock in an axial direction.

4. The combination with a vehicle of a holder for a wheel lock of the type mentioned, said holder comprising a block supported upon the vehicle, means for permanently fastening the block in place on the vehicle comprising bolts extending through a part of the vehicle and through the block, said block being of a size and shape to fit snugly within the lock when the latter is in closed position thereon, packing material of a compressible nature arranged upon the periphery of the block and a plate on the front face of the block held thereon by said bolts, said plate projecting beyond the periphery of the block at each side to prevent removal of the lock in an axial direction.

EDWARD M. BURNHAM.